United States Patent [19]
Pitts et al.

[11] 3,723,529
[45] Mar. 27, 1973

[54] DECOLORIZATION OF POLYETHYLENE POLYAMINES

[75] Inventors: James William Pitts, Port Neches; Charles Sam Steele, Nederland, both of Tex.

[73] Assignee: Jefferson Chemical Company, Inc., Houston, Tex.

[22] Filed: Oct. 19, 1970

[21] Appl. No.: 82,167

[52] U.S. Cl............260/583 N, 260/268, 260/583 P, 260/585 A, 203/41
[51] Int. Cl..............................................C07c 85/16
[58] Field of Search...........260/583 P, 583 N, 585 A; 203/41

[56] References Cited

UNITED STATES PATENTS

| | | | |
|---|---|---|---|
| 3,056,832 | 10/1962 | Stromberg | 260/583 P X |
| 3,595,921 | 7/1971 | Pitts | 260/585 A |

Primary Examiner—Joseph P. Brust
Attorney—John R. Kirk, Jr., H. G. Jackson and Terrence Dean Dreyer

[57] ABSTRACT

A process is provided for decolorizing "polyethylene polyamines," such as triethylenetetramine, and higher homologues, such as tetraethylenepentamine, by treatment with active carbon at elevated temperatures followed by distillation.

10 Claims, No Drawings

DECOLORIZATION OF POLYETHYLENE POLYAMINES

This invention relates to a process for decolorizing polyethylene polyamines and to the products formed by said treatment.

Polyethylene polyamines have been widely employed for many applications; such as in the preparation of oil additives, textile chemicals, chelating agents, fungicides, detergents, synthetic resins, coatings, printing ink, adhesives, and the like. In many applications, such as when preparing coating resins, a light colored or colorless material is desired. It is then essential that a low color polyethylene polyamine be employed.

Since polyethylene polyamines tend to discolor, as when exposed to air for extended periods, it is usually recommended that storage vessels be equipped with nitrogen blanketing when the color of the amine is important. Should the polyethylene polyamine, however, become discolored its value to a particular user could be ruined resulting in great economic loss. There is a real need, therefore, for an effective and practical method to decolorize polyethylene polyamines.

Further, in the manufacture of polyethylene polyamines; such as in commercial operations where ethylene dichloride and ammonia are reacted or an alkyl halide and a diamine are reacted, polyethylene polyamines having varied color levels are often produced.

In order for a manufacturer to successfully promote and provide an efficacious product, it is important that the polyethylene polyamine product meet the customers' needs and specifications, including color and general appearance. Thus, an effective process for providing decolorized polyethylene polyamines would be a very valuable asset to such a producer.

We have now surprisingly discovered a unique process whereby polyethylene polyamines can be effectively decolorized. In accordance with our novel method, crucial process steps and conditions are employed to provide a decolorized polyethylene polyamine. Accordingly, the polyethylene polyamines having unacceptable color levels are first treated with active carbon at elevated temperatures. The resultant product is then distilled to provide a decolorized polyethylene polyamine.

Our invention is particularly surprising in view of the fact that when polyethylene polyamines of this invention are contacted with active carbon under normal treatment conditions, very little color improvement of the polyethylene polyamine results; and usually the polyethylene polyamines are darker in color than before treatment. Further, even when treating with active carbon according to the unique conditions of this invention, the same ineffectual results are obtained unless our crucial distillation step is also performed.

It should be further noted that neither treatment with molecular sieves nor distillation of polyethylene polyamines of this invention are effective decolorizing methods.

It is therefore necessary, in order to effectively decolorize the polyethylene polyamines of this invention, that our unique process steps and our conditions both be followed.

We have found that within the broad ranges of polyethylene polyamines that the fraction starting with triethylenetetramine, and higher homologues, such as tetraethylenepentamine, and the like, are more likely to be highly colored, while ethylenediamine and diethylenetriamine do not generally require decolorizing. We have further discovered that, unlike the higher homologues, ethylenediamine and diethylenetriamine fractions can be decolorized, if desired, by simple distillation. Our process is therefore particularly directed to the treatment of polyethylene polyamine products that contain an amine that can be exemplified by the following formula:

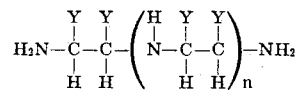

wherein each $y$ is hydrogen or $CH_3$ and $n$ is an integer from 2 to 5.

Exemplary compounds corresponding to the above formula include triethylenetetramine, tetraethylenepentamine, pentaethylenehexamine, hexaethyleneheptamine, methyl substituted derivatives thereof, and the like.

When the terms triethylenetetramine, tetraethylenepentamine, pentaethylenehexamine, and the like, are used throughout the description and claims, or their representative formulas, it should be understood that although these terms or formula represent the specific named amine in its purest state the specifically named amine compound is conventionally distilled as a product fraction such as within the boiling ranges as listed below.

Thus, the product fraction containing the specifically identified linear amines includes the conventionally distilled fraction or product. Thus, for example, by the term triethylenetetramine product, we are defining the material that is conventionally recovered as triethylenetetramine product which includes in addition to the specific linear amine other cyclic isomers such as diaminoethylpiperazine, piperazinoethylethylenediamine and other linear isomers such as nitrilotrisethylamine.

Our process can be advantageously employed in either a continuous or a batch method and therefore, if desired, can be effectively incorporated into a commercial unit. In a typical commercial unit, polyethylene polyamines are produced by the reaction of 1,2-dichloroethane and ammonia, followed by treatment with a base like sodium hydroxide to give the free amines. The broad range of polymeric amines therein produced are then separated by distillation.

The distilled products normally recovered from such a unit can be conventionally listed in their order of recovery, i.e., by their boiling ranges which are reported per ASTM Method D 1078 at 760 mm. Hg, in degrees centigrade. Exemplary are: ethylenediamine product — 115°C. minimum, initial boiling point (IBP), to 119°C. maximum, dry point (DP); diethylenetriamine product — 200°C. minimum, IBP, to 210°C. maximum, DP; triethylenetetramine product — 260°C. minimum, 5 ml., to 290°C. maximum, DP;

tetraethylenepentamine product — 310°C. minimum, 5 ml., to 320°C. minimum, 50 ml.; pentaethylenehexamine product, (ASTM, 5 mm. Hg, in degrees centigrade) 170°C., minimum 5 ml., to 260°C. maximum, 50 ml.; and the like.

Amines, such as piperazine and aminoethylpiperazine are also generally coproduced in such a commercial unit. The former amine is recovered by distillation just prior to the diethylenetriamine product removal; and the latter just after the diethylenetriamine product removal. Separation of the various amines by distillation is conventional. The purity of any particular amine fraction can, of course, be upgraded by conducting the distillation within narrower temperature gradients. Thus, the polyethylene polyamines of this invention can be treated alone, as mixtures thereof, or in admixture with other amines such as ethylenediamine, diethylenetriamine, piperazine, aminoethylpiperazine and the like.

In a commercial operation, it is advantageous to treat the crude amine mixture after first having essentially removed by distillation at least the ethylenediamine and the diethylenetriamine product and thereby a smaller quantity of product is treated according to our process. Correspondingly, the diethylenetriamine or the aminoethylpiperazine bottoms product of a commercial unit can be conveniently and advantageously treated in accordance with our invention.

As hereinbefore stated, reduction of the color of polyethylene polyamines having boiling points higher than diethylenetriamine is very difficult. Decolorization of these higher polyamines has not been effectively accomplished by distillation, treatment with molecular sieves, or by any known standard decolorizing techniques. The use of active carbon in a conventional sense to adsorb color bodies is likewise ineffective.

Normally, temperatures high enough to obtain a liquid sufficiently fluid to ensure good contact with the active carbon is employed in a carbon adsorption process. The polyethylene polyamines of this invention, when so treated with active carbon, and then filtered, not only do not effectively decrease in color but in most instances the product recovered is darker. The polyethylene polyamines of this invention, even when treated with active carbon according to the elevated temperatures of this invention, and then filtered, are not effectively decolorized. In most instances, the product is also darker in color than before said treatment. In order to effectively decolorize the polyethylene polyamines of this invention, it is crucial that they first be treated with active carbon at elevated temperatures according to this invention and then the resulting product (after carbon removal) distilled.

Although we are not to be held to any theory, or mechanism of action, it appears at this time that our process employs active carbon as a catalyst wherein the color bodies in the polyethylene polyamines are fractured during our process into lower and higher boiling materials and that our distillation process permits separation of a decolorized polyethylene polyamine.

From all indications, the carbon does not appear to act as an adsorbent due to the fact that if it were an adsorption process, the color bodies should be removed when placed in contact with the carbon and separated when filtered. The color of carbon treated materials is actually changed very little by a carbon treatment process, and in most instances, the product is darker in color. When active carbon is employed according to our method, it has been used to process over 1,000 times its weight of highly colored amines without becoming exhausted or fouled. If the active carbon were functioning as an adsorbent, it is believed that these results would not be obtainable.

Further, in support of our theory, we have found that polyethylene polyamines treated according to our process have a slightly different composition from the starting material. Although the treated products of this invention vary slightly from the compositions of the starting materials, thus indicating a catalytic process, the products so produced are suitable for all known applications. Correspondingly, they are particularly applicable for use in applications where colorless or near colorless polyethylene polyamines are desired.

As hereinbefore described, our process is applicable for use in a batchwise or continuous operation. Batch operation of our invention generally requires harsher treatment conditions with the active carbon than in a continuous process.

In a batch operation the polyethylene polyamines of this invention are contacted with active carbon in a suitable vessel, such as a flask equipped with a reflux condenser, and the admixture heated at a temperature of at least 190°C., preferably from about 200°C. to 280°C. The contacting is continued in the range of about 0.5 to about 20 hours, preferably at least 2 hours. At least about 0.5 wt. % active carbon based on the weight of treated material, preferably at least 2 wt. % active carbon, is employed. Larger amounts of active carbon, such as 5 wt. %, and more, can be employed but amounts greater than 5 wt. % are generally considered wasteful.

Pressures suitable to provide essentially liquid phase operations are essentially maintained when the active carbon and polyethylene polyamines are contacted, the primary result of said contacting being an intimate mixture of the components. The contacting can be conducted in the presence or absence of air. An inert gas, such as a nitrogen pad, can be employed during the treatment.

Subsequent to the carbon treatment, the active carbon is separated from the polyethylene polyamine, such as by filtration.

The treated polyethylene polyamines are then distilled to provide a decolorized polyethylene polyamine product. Conventional distillation procedures at the conventional conditions for the particular polyethylene polyamines to be separated are suitably employed. Vacuum fractional distillation is, of course, normally employed. Pressures from about 0 to 50 mm. Hg are exemplary. It is to be understood that the object of our distillation step is to recover polyethylene polyamine product. The term "distilled," therefore, includes any conventional method for separating such products such as by flashing, and the like.

In our continuous process, a fixed bed of active carbon is employed. Temperatures in the range of 150°C. to 280°C., preferably 190°C. to 210°C., are employed. Flow rates to provide 0.3 to about 1.3 grams of polyethylene polyamine product per gram of active carbon per hour, preferably 0.5 to about 0.7 grams of polyethylene polyamine product per gram of carbon per hour are employed.

As in the batch process, pressures suitable to provide essentially liquid phase operations are maintained. Pressures of about 20 to 100 psig, and higher, can be employed.

In a fixed bed operation, the active carbon is confined to a treatment zone so that the treated polyethylene polyamine product does not need to be processed for removal of the active carbon. The treated polyethylene polyamine products are continuously distilled according to conventional conditions as outlined for the batch operation.

The active carbon that is employed according to our invention is the same active carbon that is conventionally employed in adsorption processes. The terms "active carbon," "activated carbon," "active charcoal," and the like are used herein synonymously. The active carbons herein employed are fully described under Carbon, Active, in the Encyclopedia of Chemical Technology, Kirk-Othmer, Volume II, 1948, Interscience Publishers, Inc., New York, pp. 881–898; and the disclosure thereof is herein incorporated by reference thereto. The particular form of carbon, i.e., powder, granular, and the like, is not critical and can be suitably employed according to this invention. Active carbon can, of course, be purchased upon the commercial market. If desired, carbon can be activated according to the procedures as outlined by said reference.

The particular column employed for confining the active carbon is not critical. The column may be fabricated of stainless steel with screens to contain the active carbon. The column may be heated externally with high pressure steam, hot oil or electrically.

tiveness of a decolorizing process can thus be fairly evaluated by determining its ability to decolorize highly colored triethylenetetramine product to a color rating of not more than 50 on the Pt-Co Color Scale. A process that cannot decolorize triethylenetetramine samples having a color of 50 Pt-Co, or higher, to a 50 Pt-Co rating, or less, cannot be considered effective because the product may not be suitable for many applications and, in most instances, would not meet the consumer specifications.

Accordingly, our process is so effective that triethylenetetramine product which measured 5 to 7 on the Gardner Color Scale, and above, can be reduced to a Pt-Co rating of 50, and usually below. Our process has consistently produced triethylenetetramine product having a 20-40 Pt-Co rating, and in many cases even lower.

Illustrative of the foregoing discussion and description, and not to be interpreted as a limitation on the scope thereof or on the materials herein employed, the following examples are presented.

EXAMPLE I

Samples of triethylenetetramine were treated for color reduction using the active carbon catalyst, concentrations, temperatures and times as reported in Table I. The color rating of the triethylenetetramine product before treatment with active carbon, after carbon treatment and carbon removal, and following the distillation, are also reported in Table I. The samples of triethylenetetramine were contacted with the active carbon in accordance with the conditions reported in Table I. Following removal of carbon by filtration, the product was fractionally distilled. The data are reported in Table I.

TABLE I

Treatment of triethylenetetramine for color reduction (Batch)

| | | | | Color Rating | | |
|---|---|---|---|---|---|---|
| Run number | Carbon, percent | Temp., °C. | Time, hr. | Starting material | After carbon treatment and carbon removal | After distillation |
| 1 | a3 | 110 | 2.5 | 6 Gardner | 7 Gardner | 6-7 Gardner. |
| 2 | a3 | 140 | 2.0 | do | do | 90 Pt-Co w/green hue. |
| 3 | a3 | 250 | 2.5 | do | do | 335 Pt-Co. |
| 4 | b10 | 260 | 18.0 | do | do | 20 Pt-Co. |
| 5 | c3 | 250 | 2.5 | do | do | 30 Pt-Co. |
| 6 | a1 | 260 | 1.0 | do | do | 30 Pt-Co. |
| 7 | 0 | 260 | 4.0 | do | Unchanged | Unchanged. |

Polyethylene polyamines decolorized according to our invention are advantageously used in applications where low colored or colorless products are made. The amount of color, i.e., the color rating of the polyethylene polyamines, are conventionally depicted by using the 1953 series of the Gardner Color Scale and/or the American Public Health Association Platinum-Cobalt (Pt-Co) Color Scale.

Depending upon the particular application in which it is used, polyethylene polyamines of varying color levels are required. However, in order for any decolorizing process to be considered either economical or effective, the process must at least meet the desired color specifications of the consumer. Using triethylenetetramine product as an example, it is preferred that the product have a color rating of not greater than 50 Pt-Co when it is to be used in the manufacture of low color or colorless materials. The effeca. Pittsburgh Activated Carbon, Pittsburgh, Penna., Type CAL Granular Carbon;

Physical Properties

| | |
|---|---|
| Total surface area (N$_2$, BET method+), m$^2$/g. | 1000-1100 |
| Apparent density (bulk density, dense packing), g./cc. | 0.44 |
| lb./ft.$^3$ | 27.5 |
| Density as packed in column lb./ft.$^3$ | 25 |
| Particle density (Hg displacement), g./cc. | 0.7 |
| Real density (He displacement), g./cc. | 2.1 |
| Pore volume (within particle), cc./g | 0.94 |
| Voids in dense packed column, % | 38 |
| Specific heat at 100°C. | 0.25 |

Specifications

| | |
|---|---|
| Mesh size, U.S. sieve series | 12 × 40 |
| Larger than 12 mesh, max., % | 5 |

| | |
|---|---|
| Smaller than 40 mesh, max., % | 5 |
| Mean particle diameter, mm. | 0.90-1.10 |
| Iodine number, min. | 1000 |
| Molasses number, min. | 230 |
| Ash, max., % | 8.5 |
| Moisture as packed, max., % | 2.0 |
| Abrasion number, max. | 75 | b. Barney Chevey Activated Charcoal, raw material — pecan; activation — high temperature steam; adsorption characteristics — 40 minutes (minimum) accelerated chloropicrin. Test to break-thru; nominal mesh size — 12 × 30; hardness — greater than 9090 by Ball Abrasion test; bulk density — 0.47 — 0.52 grams per ml. (dense packing), 29 to 32 lbs. per cubic foot (typical); ash — 5% maximum; moisture content — 5% maximum as packed.

c. Pittsburgh Activated Carbon, Type OL from bituminous coal;

Physical Properties

| | |
|---|---|
| Total surface area ($N_2$, BET method+), m²/g. | 1000-1100 |
| Apparent density (bulk density, dense packing), g./cc. | 0.44 |
| lb./ft.³ | 27.5 |
| Particle density (Hg displacement), g./cc. | 0.78 |
| Real density (He displacement), g./cc. | 2.1 |
| Pore volume (within particle), cc./g. | 0.81 |
| Voids in dense packed column, % | 44. |
| Specific heat at 100°C. | 0.25 |

Specifications

| | |
|---|---|
| Mesh size, U.S. sieve series | 20 × 50 |
| Larger than 20 mesh, max., % | 10 |
| Smaller than 50 mesh, max., % | 5 |
| Mean particle diameter, mm. | 0.50 - 0.70 |
| Iodine number, min. | 1000 |
| Molasses number, min. | 200 |
| Ash, max., % | 8 |
| Moisture as packed, max., % | 2 |
| Abrasion number, min. | 70 |

The foregoing runs effectively demonstrate the criticality of decolorizing according to our invention. Effectively demonstrated is the fact that absent the distillation step the color of the treated product is not improved and in most instances has worsened.

EXAMPLE II

Triethylenetetramine product was again treated according to our invention, as in Example I, except that the same active carbon was employed for all of the runs. The operating conditions and data are reported in Table II.

The foregoing example effectively demonstrates that even after repeated uses the active carbon when employed according to this invention is still effective in decolorizing the triethylenetetramine without any kind of regeneration of the carbon.

EXAMPLE III

A sample of triethylenetetramine product was treated with 3 wt. % active carbon (Pittsburgh — Activated Carbon Type CAL 12 × 40 Mesh) for 2½ hours by refluxing at a temperature of 260°C. The triethylenetetramine product before treatment with active carbon had a rating of 5 on the Gardner Color Scale. Following the active carbon treatment and removal of the carbon therefrom, the treated triethylenetetramine product had a rating of 6–7 on the Gardner Color Scale. Following the distillation the triethylenetetramine product had a color rating of 40 on the Platinum-Cobalt Scale.

Chromatographic analysis and boiling range determinations were made on the starting material and the treated material, prior to distillation, and are reported in Table III.

TABLE III

TRIETHYLENETETRAMINE

| Boiling Range, ASTM, °C. | | | Chromatographic Analysis, Area % | | |
|---|---|---|---|---|---|
| Material | Starting | Treated Material | | Starting Material | Treated Material |
| IBP | 278.0 | 270.0 | Lights,% | 0.74 | 2.17 |
| 5 ml | 279.1 | 276.9 | TETA,% | 97.80 | 95.50 |
| 95 ml | 296.0 | 302.0 | Heavies,% | 0.80 | 2.30 |
| DP | 299.9 | 310.0 | | | |

The foregoing example effectively demonstrates decolorization according to our invention and further demonstrates the change in composition after active carbon treatment.

EXAMPLE IV

A sample of tetraethylenepentamine having a Gardner rating of 7 was decolorized according to the process described in Example I. The tetraethylenepentamine was treated with 3 wt. % Pittsburgh Activated Carbon Type CAL Mesh size 12 × 40 for two hours at 270°C. Following treatment with activated carbon and filtration, the tetraethylenepentamine product had a rating of 9 on the Gardner Scale. Following distillation of the product, a tetraethylenepentamine product was recovered having a 150 Pt-Co Color Scale rating.

TABLE II

| Weight percent carbon[a] | Heating Time, hrs. | Temp., °C. | Color of product, Pt-Co | Type of distillation | Notes |
|---|---|---|---|---|---|
| 3 | 2½ | 250 | 40 | Fractional | 1st use of carbon. |
| 3 | 2½ | 250 | 35 | do | 2nd use of carbon. |
| 3 | 2½ | 250 | 40 | do | 3rd use of carbon. |
| 3 | 2½ | 250 | 50 | do | 4th use of carbon, bad stirring action. |
| 3 | 2½ | 250 | 35 | do | 5th use of carbon. |
| 3 | 2½ | 250 | 30 | do | 6th use of carbon. |
| 3 | 2½ | 250 | 40 | do | 7th use of carbon. |
| 3 | 2½ | 250 | 50 | do | 8th use of carbon, bad stirring action, 4 wt. percent 316 S.S. packing added. |
| 3 | 2½ | 250 | 25 | do | 9th use of carbon, nitrogen pad. |
| 3 | 2½ | 250 | 20 | do | 10th use of carbon, nitrogen pad 4 wt. percent 316 S.S. packing added. |

[a] As reported in Table I.

EXAMPLE V

A triethylenetetramine product, 6 Gardner in color, was charged through a fixed carbon bed, 1 × 35 inches containing 180 grams of Pittsburgh Activated Carbon Type CAL 12 × 40 carbon, at 190°C. Triethylenetetramine was charged so as to provide about 0.65 to 0.75 grams of the amine per gram of carbon per hour. The distilled carbon column effluent had a 25 Pt-Co color rating.

EXAMPLE VI

Diethylenetriamine column bottoms, such as from a typical commercial unit, representing a mixture of crude amines from which ethylenediamine has been essentially removed, was charged through a fixed carbon bed as in Example V except that a temperature of 200°C. was employed. The carbon column effluent was separated into its various products by distillation under vacuum. Very low in color triethylenetetramine, tetraethylenepentamine, and pentaethylenehexamine were each recovered. The diethylenetriamine column bottoms that were first charged to the fixed carbon bed were black in color.

The preceding examples can be repeated with similar success by substituting the generically and specifically described reactants and conditions of this invention for those employed in the examples. As will be evident to those skilled in the art, various modifications of this invention can be made or followed in light of the discussion and disclosure herein set forth without departing from the spirit or scope thereof.

We claim:

1. In a process for decolorizing polyethylene polyamine product prepared by the reaction of ethylene dichloride with ammonia the improvement which comprises contacting in a batch process with active carbon a polyethylene polyamine product that contains a polyethylene polyamine represented by the following formula:

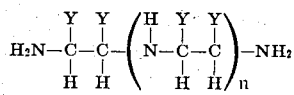

wherein each $y$ is hydrogen or $CH_3$ and $n$ is an integer from 2 to 5; removing said active carbon from said polyethylene polyamine; and distilling said polyethylene polyamine to provide a decolorized product; wherein said contacting is conducted in essentially liquid phase at a temperature of at least 190°C. for a time in the range of about 0.5 to 20 hours; and wherein said active carbon is employed in an amount to provide at least 0.5 wt. % active carbon based on the weight of said polyethylene polyamine product.

2. The process according to claim 1 wherein said temperature is in the range from about 220°C. to 280°C.; wherein said active carbon is employed in an amount to provide at least 2 wt. % active carbon; and wherein said contacting is conducted for a time of at least 2 hours.

3. The process according to claim 2 wherein said polyethylene polyamine comprises triethylenetetraamine, tetraethylenepentamine, and pentaethylenehexamine.

4. The process according to claim 3 wherein said polyethylene polyamine is triethylenetetramine.

5. The process according to claim 2 wherein said polyethylene polyamine product is contacted with active carbon after first having essentially removed by distillation at least the ethylenediamine and the diethylenetriamine products.

6. In a process for decolorizing polyethylene polyamine products prepared by the reaction of ethylene dichloride with ammonia the improvement which comprises contacting in a continuous process with a fixed bed of active carbon a polyethylene polyamine product that contains a polyethylene polyamine represented by the following formula:

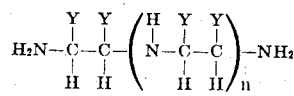

wherein each $y$ is hydrogen or $CH_3$ and $n$ is an integer from 2 to 5; and distilling the polyethylene polyamine product that has been so contacted to provide a decolorized product; wherein said contacting is conducted in essentially liquid phase at a temperature in the range of about 150°C. to 280°C.; and wherein flow rates to provide 0.3 to about 1.3 grams of polyethylene polyamine product per gram of active carbon per hour are employed.

7. The process according to claim 6 wherein said temperature is in the range of about 190°C. to 210°C., and wherein said flow rate is in the range of about 0.5 to about 0.7 gram of polyethylene polyamine per product gram of carbon per hour.

8. The process according to claim 7 wherein said polyethylene polyamine product comprises triethylenetetramine, tetraethylenepentamine and pentaethylenehexamine.

9. The process according to claim 8 wherein said polyethylene polyamine is triethylenetetramine.

10. The process according to claim 7 wherein said polyethylene polyamine product is contacted with active carbon after first having essentially removed by distillation at least the ethylenediamine and the diethylenetriamine products.

* * * * *